Nov. 24, 1959  K. SCHACHNER ET AL  2,914,018
WATER--BORNE MOTOR-POWERED TOWING DEVICE
FOR CONTROL BY A WATERSKIER
Filed Oct. 14, 1955  2 Sheets-Sheet 1

INVENTORS:
KURT SCHACHNER
HELMUT STIEGER
BY
Richardson, David and Nordon
ATTORNEYS Nov. 24, 1959 K. SCHACHNER ET AL 2,914,018
WATER-BORNE MOTOR-POWERED TOWING DEVICE
FOR CONTROL BY A WATERSKIER
Filed Oct. 14, 1955 2 Sheets-Sheet 2
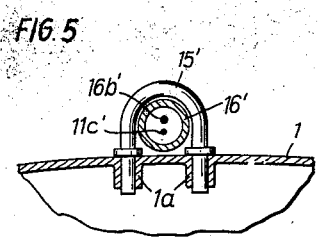
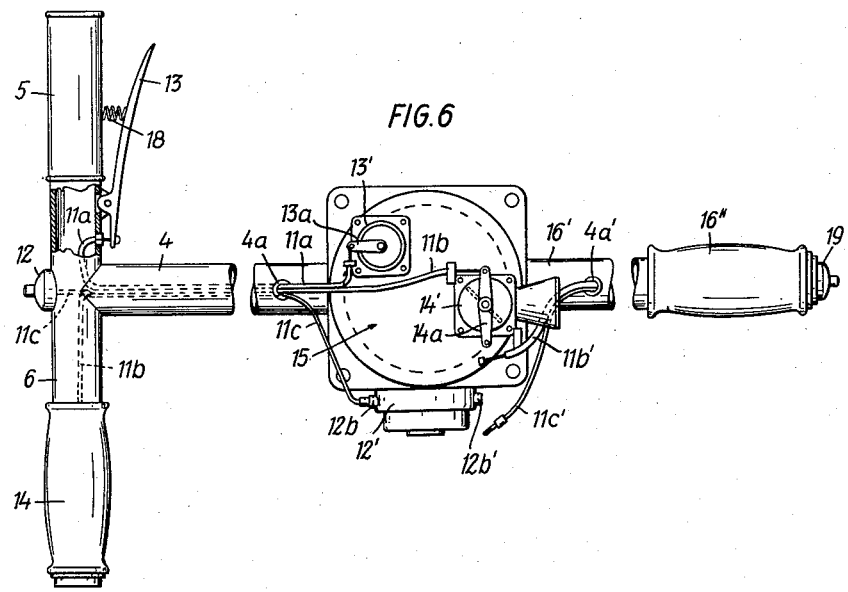
INVENTORS:
KURT SCHACHNER
HELMUT STIEGER
BY
Richardson, David and Nydon
ATTORNEYS.

United States Patent Office 2,914,018
Patented Nov. 24, 1959

2,914,018

WATER-BORNE MOTOR-POWERED TOWING DEVICE FOR CONTROL BY A WATERSKIER

Kurt Schachner and Helmut Stieger, Klagenfurt, Austria

Application October 14, 1955, Serial No. 540,576

Claims priority, application Austria November 22, 1954

5 Claims. (Cl. 115—6.1)

The invention relates to a water-borne motor-powered towing device for control by a waterskier.

Previous methods of traction for waterskiers employ a motorboat and cable, waterski lifts and shore-operated systems for towing the waterskier with an unmanned towing boat which circles around a fixed point. None of these systems enables the waterskier to determine by himself the direction, speed and duration of his run because these variables are directly dependent on the driver of the motorboat or on the lift or roundabout system.

It is an object of the invention to provide a waterborne motor-powered towing device which can be controlled by the waterskier and which enables the waterskier to steer and control the device by himself, i.e. to select and set by himself the speed, direction and duration of his run, instead of being merely towed with wave riding and swinging.

In order to achieve this object the invention teaches to construct the device as a freely movable waterborne vessel, which contains the motor, fuel tank etc. whereas the motor is started and controlled by control handles disposed at the end of a traction element (guiding, steering and control rod). The device is driven by a propeller shaft extending from the motor rearwardly out of the vessel and carrying the propeller at its end. The traction element (guiding, steering and control rod) is constructed according to the invention as a tubular body, which is movable only in a vertical direction and downwardly only as far as to the water level. This so-called traction element, which may take various forms regarding its length and construction, carries handles at its end which extend horizontally on both sides and carry the motor switch, ignition lever, and the starter and throttle controls.

The control cables from the ignition lever and the starter and throttle controls extend inside this traction element to the motor in the vessel. Since the vessel is unmanned and its interior accommodates only the motor and the fuel tank, it may be of small size and high maneuverability. This fact enables an easy steering, which is effected by means of the traction element, which has a length of 2-4 meters and serves as a steering lever between the waterskier and the vessel. In practice the riding waterskier turns and tilts the waterskis to go into a curve and guides the traction element also into the curve to cause the motor-powered vessel to perform the curve under the pressure exercised on the traction element. Thus the steering means of the vessel may be considered to consist of the waterskis of the skier, which are tilted to go into a curve, whereby the vessel is caused to change its direction.

The invention includes also a development of the vessel whereby its field of application is increased so as to enable the waterskier or another person to use the vessel as a motorboat for travelling on the water without skis. Such use has proved convenient or necessary, e.g., to facilitate a change of the location of the vessel or to increase its field of service.

To this end the invention provides the vessel with a seat. In one embodiment of the invention that seat may be removably inserted in an opening of the vessel and may be inverted to serve as a cover which closes the opening of the vessel.

The invention provides further that the traction element (guiding, steering and control rod) is removably connected to the vessel and that the cables for interrupting the ignition and for the electric starter as well as the throttle are removably coupled to the motor, more particularly to the appropriate components thereof. The traction element (guiding, steering and control rod) can be folded together and be fixed in its extended position.

The second embodiment of the invention enables the use of the vessel as a motorboat after the guiding, steering and control rod has been removed and the seat has been applied. This conversion can be effected in a simple manner and within short time and increases the application of the vessel according to the invention in a considerable degree.

It has proved particularly suitable to power the vessel with an outboard motor. That outboard motor can be fixed relative to the vessel in a central position so that the vessel can be steered by an appropriate riding technique of the waterskier as has been described with reference to the first embodiment.

Further details of the invention will be explained with reference to the accompanying drawings, which show two illustrative embodiments of the water-borne motor-powered towing device.

Fig. 1 is a side view,

Fig. 2 a top plan view, and

Fig. 3 a perspective view of a first embodiment of the device.

Fig. 5 is a vertical transverse sectional view showing as a detail the means for locking the outboard motor in an axial position relative to the vessel of Fig. 4.

Fig. 6 is a fragmentary top plan view showing the outboard motor with its steering and control lever and the handle end of the traction rod of the embodiment of Fig. 4.

Figure 1:
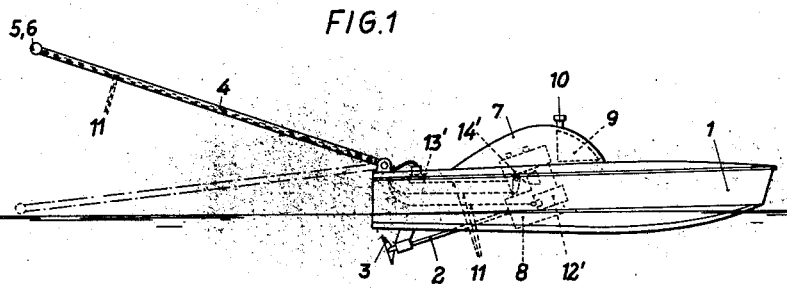
Figure 2:
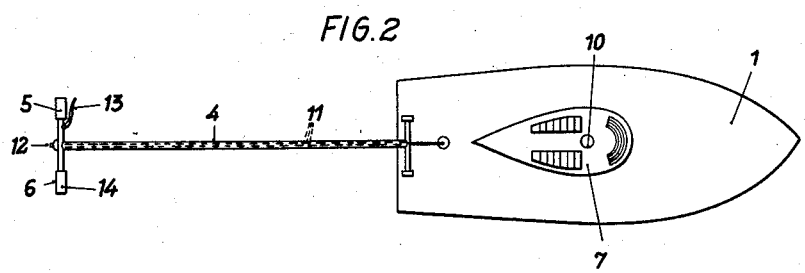
Figure 3:
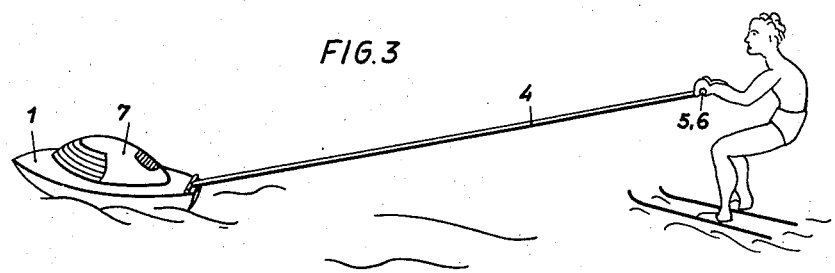

According to Figs. 1–3 the water-borne motor-powered towing device comprises a motor-powered vessel 1 having a rearwardly extending propeller shaft 2 carrying a propeller 3, and the rearwardly extending, vertically movable tractor element or guiding, steering and control rod 4, carrying horizontally extending handles 5 and 6 affixed to its rear end. The rod 4 is hinged to the vessel 1 for movement only in a vertical plane. The lower limiting position of the traction element 4 is indicated with dash lines. In this position the traction element 4 engages the rear end of the vessel 1 whereby it is prevented from moving below the water level. A hinged cover 7 is arranged at the top of the vessel 1 to enable the servicing of the motor and refuelling. The built-in motor 8, the fuel tank 9 with the filling opening 10, and the control cables 11 for the starter, ignition lever and throttle disposed inside the vessel are indicated by dash lines. The control cables 11 extend through the guiding, steering and control rod 4 to the two horizontally extending handles 5 and 6, where they are connected respectively to the starter control 12, ignition lever 13 and throttle lever 14. The cables 11 extending in the traction element 4 comprise a mechanical cable which leads from the ignition lever 13 to a switch 13', which can be operated to close the ignition circuit and which is opened upon release of the ignition lever 13. The mechanical cable consists preferably of a spring-loaded Bowden cable in a flexible steel conduit. Another mechanical cable extends from the hand-operated throttle control 14 to the throttle of the carburetor 14' and an electrical cable extends from the start push putton 12 to the starter 12'. The ignition of the motor will function only as long as the ignition lever is being depressed. As soon as the ignition lever is released, the ignition of the motor will be interrupted, whereby the motor stops and the vessel comes to a halt. For this reason the ignition lever must always be depressed during starting, speeding-up and throughout the run. The throttle control determines the speed of the motor and thereby the velocity of the vessel. In the case of a fall the driver must in any case release the handles so that the returning ignition lever cuts out the ignition of the motor. The vessel and the guiding, steering and control rod (traction element) are watertightly sealed and the air supply to the motor is effected through valve slots in the hinged cover. The exhaust of the motor is submerged. Fig. 3 shows how such a device can be used for waterskiing.

Figure 4:
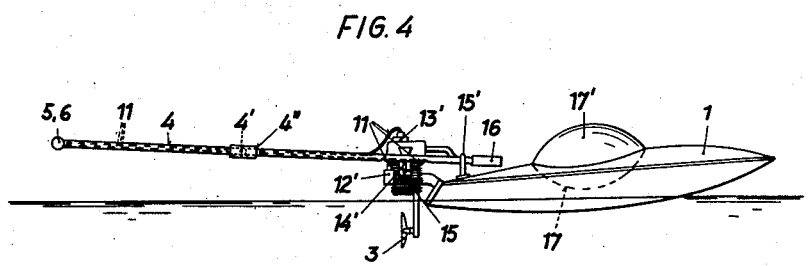
Fig. 4 is a side view of a second embodiment.

According to Fig. 4 the vessel 1 is also formed as a small-scale stepless hydroplane. It is provided with a seat 17 inserted in an opening of the vessel. This seat 17 has concave and convex sides and as shown in solid lines in Fig. 4 can be detachably mounted to the top of the vessel with the convex side facing upwardly to serve as a cover 17' closing the opening of the vessel. This enables the user of the device to carry various articles, particularly clothes, in the vessel, where they are watertightly enclosed. As is indicated in Fig. 4 with dash lines the cover may be inverted to serve as a seat 17.

The guiding, steering and control rod (traction element) 4 is detachably connected to the vessel 1. It is provided with an intermediate hinge 4' so that it can be folded together to reduce its length. Thus the element 4 can be carried along more easily when the vessel is used as a motorboat. A fixing sleeve 4" is provided which can be passed over the hinge 4' to locate the element 4 in its extended position, in order to prevent the same from being folded together during waterskiing. The cables for interrupting the ignition, for the electric starter and for the throttle, which are operated from the handles 5, 6, can be removed from the corresponding parts of the motor.

The use of the vessel 1 as a motorboat and the provision of a seat 17 is facilitated by the arrangement of the motor 15 as an outboard motor 15 having a conventional propeller 3. The outboard motor 15 is provided with the usual steering and control lever 16. The motor 15 carries again a switch 13' for interrupting the ignition. In this case the switch 13' consists preferably of a normally closed switch and the lever 13 is arranged to leave the switch 13' closed when the lever 13 is depressed whereas the switch 13' will be opened by means of the control cable upon release of the lever 13. Thus the control cable 11 connecting the lever 13 to the switch 13' exerts a biassing force which opposes the depressing of the lever and thus tends to hold the switch 13' normally open unless the lever 13 is depressed. The mechanical cable for controlling the throttle of the carburetor 14' and the electrical cable for controlling the starter are duplicated in the element 4 and in the steering and control lever 16. The cables in the element 4 and in the lever 16 are alternatively connectable to the throttle and starter. The throttle control cable in the lever 16 may be connected in the usual manner to a rotary handle. A locking device 15' is provided for locating the motor 15 in a central or axial position relative to the vessel 1. This locking device is rendered inoperative when the vessel is used as a motorboat so that the outboard motor 15 is unlocked and the boat can be steered in the usual manner.

It is apparent from Fig. 5 that the means for locking the motor 15 in an axial position relative to the vessel 1 comprise a bail member 15' having two plug ends, which are press-fitted in bushes or sockets 1a carried by the top of the vessel 1. The bail member 15' is applied over the tube 16' forming part of the steering and control lever generally indicated at 16 in Fig. 4.

Fig. 6 shows in detail the control arrangement of the embodiment of Fig. 4.

The motor 15 is provided with the ignition switch 13', which tends to hold itself closed and is operable by the arm 13a, which can be detachably connected to the cable 11a extending in the tubular traction element 4 to the ignition switch lever 13 carried by the handle 5. A coiled compression spring 18 is fixed at one end to the lever 13 and at the other hand to the handle 5 and tends to hold the ignition switch 13' open through the intermediary of the lever 13, cable 11a, and arm 13a. To cause the switch 13' to close, the lever 13 must be depressed. It is apparent that the switch 13' will be automatically opened when the lever 13 is released and will hold itself closed when the cable 11a is disconnected from the arm 13a.

The motor 15 is also provided with a starter 12', which carries pairs of electric plug sockets 12b and 12b' connected in parallel and disposed on opposite sides of the starter. Each of these pairs of plug sockets 12b and 12b' is adapted to receive the plug end of a two-wire electric starter cable 11c or 11c'. The electric starter cable 11c extends through the tubular traction element 4 to the start push button 12 carried by the handle element 5, 6. The electric starter cable 11c' extends through the tubular part 16' of the steering and control lever 16 to the start push button 19 carried at the free end of said control lever. Operation of either of the push buttons 12 and 19 will short-circuit the two wires of the respective cable 11c or 11c' and will thus operate the starter as long as the button is pressed. The button can be released when the motor 15 has been started.

The motor 15 includes a carburetor 14' provided with a double-armed throttle lever 14a. Either arm of this throttle lever is detachably connectable to one of the cables 11b, 11b'. The cable 11b extends in the tubular traction element 4 and in the handle 6 to the rotary control grip 14, which is carried by the handle 6 and can be rotated to open the throttle, as is well known from motorcycles. The cable 11b' extends in the tubular part 16' of the control lever 16 to the rotary grip 16" thereof, which is similar in construction and function to the grip 14.

When the vessel is to be used as a towing device the bail member 15' is applied over the lever tube 16' and inserted in the bushes 1a. The cables 11a, 11b, and 11c are connected to the arm 13a, throttle lever 14a, and sockets 12b, respectively. The cables 11b' and 11c' are disconnected from the sockets 12b' and the throttle lever 14a, respectively.

When the vessel is to be used as a motor boat the cover 17' is inverted to serve as a seat 17. The cables 11b' and 11c' are connected to the sockets 12b' and the throttle lever 14a, respectively. The cables 11a, 11b and 11c are disconnected from the arm 13a, throttle lever 14a, and sockets 12b. The traction rod 4 and the bail member 15' are removed.

Various modifications are possible within the scope of the invention e.g., the ignition switch may be combined with the ignition lever at the control handle and may be connected in the ignition circuit by an electrical cable extending in the tubular traction element 4. The various control cables extending in the traction element need not be directly connected to the parts controlled by them but may be detachably coupled at the rear end of the vessel to secondary control cables permanently connected to the ignition switch, throttle and starter.

What we claim is:

1. A water-borne, motor-powered towing device for control by a waterskier, comprising, a freely movable water-borne vessel, a motor and a fuel tank carried by said vessel, a starter and control elements carried by said motor, a rigid traction element extending rearwardly from and pivoted to said vessel with freedom of relative movement only in a vertical plane, control handles carried by the rear end of said traction element, and means providing an operative connection between said control handles and said starter and control elements for starting and controlling the motor by means of said control handles.

2. A device as set forth in claim 1, in which said motor consists of an outboard motor pivoted to said vessel and which comprises means for locking said outboard motor in an axial position relative to said vessel.

3. A device as set forth in claim 1, which comprises an ignition switch which is releasable from a closed position to interrupt the ignition of the engine, and a biassed ignition lever carried by one of said handles and operatively connected to said switch to close the same when said lever is operated against its bias.

4. A device as set forth in claim 1, in which said vessel comprises a top having an opening and a closure member having concave and convex sides is detachably mounted to said top to close said opening with one of said sides facing upwardly and adapted to be detachably mounted to said top in an inverted position to close said opening.

5. A water-borne, motor-powered towing device for control by a waterskier, comprising a freely movable water-borne vessel, an outboard motor pivotally connected to said vessel, a fuel tank carried by said vessel, means for locking said outboard motor in an axial position relative to said vessel, a steering and control lever carried by said motor, said motor comprising an ignition switch, a throttle, and a starter, a rigid tubular traction element connected to said vessel and extending rearwardly therefrom, control handles carried by the rear end of said traction element, ignition switch, throttle and starter control means carried by said control handles, throttle and starter control means carried by said steering and control lever, three cables extending in said traction element from said ignition switch, throttle and starter control means carried by said control handles to the vessel, means for detachably coupling said three cables to said ignition switch, throttle and starter to enable a control of the motor by said control means carried by said control handles, two cables connected to said throttle and starter control means carried by said steering and control lever, and means for detachably coupling said two cables to said throttle and starter to enable a control of the motor by said control means carried by said steering and control lever.

References Cited in the file of this patent

UNITED STATES PATENTS

| | | |
|---|---|---|
| 2,451,781 | Steele | Oct. 19, 1948 |
| 2,708,759 | Strawn | May 24, 1955 |
| 2,776,443 | Howard | Jan. 8, 1957 |

FOREIGN PATENTS

| | | |
|---|---|---|
| 822,466 | France | Dec. 30, 1937 |
| 864,217 | Germany | Jan. 22, 1953 |
| 1,026,729 | France | Apr. 30, 1953 |